United States Patent
Edmunds et al.

(10) Patent No.: US 12,510,941 B2
(45) Date of Patent: Dec. 30, 2025

(54) COOLING MODULE

(71) Applicant: ICEOTOPE GROUP LIMITED, Rotherham (GB)

(72) Inventors: Neil Edmunds, Rotherham (GB); John Charlesworth, Rotherham (GB)

(73) Assignee: ICEOTOPE GROUP LIMITED, Rotherham (GB)

( * ) Notice: Subject to any disclaimer, the term of this patent is extended or adjusted under 35 U.S.C. 154(b) by 337 days.

(21) Appl. No.: 17/787,843

(22) PCT Filed: Dec. 24, 2020

(86) PCT No.: PCT/GB2020/053372
§ 371 (c)(1),
(2) Date: Jun. 21, 2022

(87) PCT Pub. No.: WO2021/130504
PCT Pub. Date: Jul. 1, 2021

(65) Prior Publication Data
US 2023/0029001 A1 Jan. 26, 2023

(30) Foreign Application Priority Data
Dec. 24, 2019 (GB) .................................... 1919289

(51) Int. Cl.
*G06F 1/20* (2006.01)
*H05K 7/20* (2006.01)

(52) U.S. Cl.
CPC ......... *G06F 1/206* (2013.01); *H05K 7/20236* (2013.01); *G06F 2200/201* (2013.01)

(58) Field of Classification Search
CPC .... G06F 1/206; G06F 2200/201; G06F 1/203; H05K 7/20236; H05K 7/20772
See application file for complete search history.

(56) References Cited

U.S. PATENT DOCUMENTS

| 4,891,688 A | 1/1990 | Longerich |
| 5,305,184 A | 4/1994 | Andresen |
| (Continued) | | |

FOREIGN PATENT DOCUMENTS

| CN | 101433135 A | 5/2009 |
| CN | 106774748 A | 5/2017 |
| (Continued) | | |

OTHER PUBLICATIONS

"ullage in the Oil and Gas Industry, Jul. 2024, collinsdictionary,https://www.collinsdictionary.com/dictionary/english/ullage#google_vignette" (Year: 2024).*

(Continued)

*Primary Examiner* — Santosh R Poudel
(74) *Attorney, Agent, or Firm* — Bochner PLLC; Andrew D. Bochner

(57) ABSTRACT

A cooling module for a printed circuit board having one or more heat generating components. The cooling module comprises a casing defining a first internal volume adapted for mounting a printed circuit board therein, the casing comprising a first internal major surface and a second internal major surface. The cooling module further comprises a chamber defining a second internal volume in fluid communication with the first internal volume. The first and/or second internal major surface comprises a first cavity. The first and/or second internal major surface further comprises a first channel connecting the first cavity to the second internal volume.

10 Claims, 6 Drawing Sheets

(56) References Cited

U.S. PATENT DOCUMENTS

| | | | |
|---|---|---|---|
| 5,427,174 A | 6/1995 | Lomolino, Sr. et al. | |
| 6,304,447 B1 | 10/2001 | Bortolini | |
| 10,694,643 B2* | 6/2020 | Enright | H05K 7/20318 |
| 2006/0118280 A1 | 6/2006 | Liu | |
| 2012/0156108 A1* | 6/2012 | Fondurulia | C23C 16/4401 |
| | | | 422/534 |
| 2014/0261738 A1* | 9/2014 | Whelan, IV | B60K 15/03 |
| | | | 137/142 |
| 2015/0062806 A1* | 3/2015 | Shelnutt | H05K 7/20318 |
| | | | 361/679.53 |
| 2016/0120019 A1 | 4/2016 | Shedd et al. | |
| 2016/0307685 A1* | 10/2016 | White | H01F 27/00 |
| 2017/0303434 A1* | 10/2017 | Katsumata | H05K 7/20327 |
| 2018/0042138 A1* | 2/2018 | Campbell | H05K 7/203 |
| 2018/0153058 A1 | 5/2018 | Hirai | |
| 2018/0199465 A1* | 7/2018 | Metzler | H05K 7/20936 |
| 2019/0177052 A1* | 6/2019 | Battaglia | B65D 55/16 |
| 2019/0390603 A1* | 12/2019 | Snyder | H05K 7/203 |
| 2020/0093037 A1* | 3/2020 | Enright | H05K 7/20381 |

FOREIGN PATENT DOCUMENTS

| | | |
|---|---|---|
| CN | 107846813 A | 3/2018 |
| CN | 109782880 A | 5/2019 |
| CN | 209511937 U | 10/2019 |
| EP | 0369827 A1 | 5/1990 |
| EP | 0456508 A2 | 11/1991 |
| JP | S60136352 A | 7/1985 |
| JP | H01103854 A | 4/1989 |
| JP | 2012527109 A | 11/2012 |
| JP | 2017529703 A | 10/2017 |
| WO | 2013075620 A1 | 5/2013 |
| WO | 2018016261 A1 | 1/2018 |
| WO | 2018096362 A1 | 5/2018 |
| WO | WO-2019048864 A1 * 3/2019 ........... H01L 23/367 |
| WO | 2021130504 A1 | 7/2021 |

OTHER PUBLICATIONS

International Search Report and Written Opinion issued in App. No. PCT/GB2020/053372, mailing date Mar. 29, 2021, 12 pages.

GB Search Report issued in App. No. GB1919289.7, dated Jun. 9, 2020, 5 pages.

Communication pursuant to Article 94(3) EPC of the European Patent Office in related European Patent Appl. No. 20838278.8, dated May 9, 2025, 5 pages.

Decision of Refusal of the Japan Patent Office in related Japanese Appl. No. 2022-538969, dated May 2, 2025, 12 pages.

First Office Action of the China Patent Office in related Chinese Appl. No. 202080089332.5, dated Apr. 16, 2025, 17 pages.

First Examination Report of the Indian Patent Office in related IN Patent Appl. No. 202217036283, dated Oct. 13, 2025, 7 pages.

* cited by examiner

COOLING MODULE

TECHNICAL FIELD

The disclosure concerns a cooling module, in particular a cooling module for a printed circuit board having one or more heat generating components.

BACKGROUND

Many types of electrical/electronic component generate heat during operation. In particular, electrical computer components such as motherboards, central processing units (CPUs), graphical processing units (CPUs), memory modules, hard disks, and power supply units (PSUs) may dissipate substantial amounts of heat when in use. Heating of the electrical components to high temperatures can cause damage, affect performance, or cause a safety hazard. Accordingly, substantial efforts have been undertaken to find efficient, high performance systems for cooling electrical components effectively and safely.

One type of cooling system uses liquid cooling. Although different liquid cooling assemblies have been demonstrated, in general the electrical components are immersed in a coolant liquid so as to provide a large surface area for heat exchange between the heat generating electrical components and the coolant.

International patent publication number WO-A-2010/130993 and US-A-2010/0290190 (commonly assigned with this invention) describe a cooling device that uses a sealable module for containing one or more heat generating electronic components, together with a liquid coolant in which the electronic components are immersed. Immersion of the electronic components in a fluid (liquid and/or gas) that carries heat away from the electronic components can be thermodynamically-efficient. The coolant may be thermally conductive whilst being electrically non-conductive and may further have advantageous convective properties. Moreover, the coolant can be selected and used so as not to cause damage to the electronic components in normal operation. Nevertheless, the coolant could cause damage elsewhere, for example due to toxicity, corrosion or other reactive, physical, or chemical properties.

For these reasons, and since the coolant may be costly, it is desirably contained and typically sealed within a casing (a tank or container). This is done so that the electronic components are immersed in the coolant, but without the coolant being lost or otherwise exposed outside the tank.

Furthermore, when filling the casing with the coolant, there may additionally be a volume of ullage air. The ullage air may be advantageous to the system. Both the liquid coolant and the ullage air may expand through being heated by the electronic components; however, the ullage air may be more compressible than the liquid coolant, and therefore the ullage air may act to mitigate pressure increases in the system. It is desirable to distance the ullage air from the electronic components, so that the electronic components are immersed in the coolant to ensure they may be cooled effectively.

SUMMARY

Against this background, there is provided a cooling module for a printed circuit board having one or more heat generating components in accordance with claim 1. Further features of the invention are detailed in the dependent claims and herein. Features of a method corresponding with those of the cooling module may additionally be provided.

According to the present disclosure, there is provided a cooling module for a printed circuit board having one or more heat generating components, the cooling module comprising: a casing defining a first internal volume adapted for mounting a printed circuit board therein, the casing comprising a first internal major surface and a second internal major surface; and a chamber defining a second internal volume in fluid communication with the first internal volume; wherein the first and/or second internal major surface comprises a first cavity; and the first and/or second internal major surface further comprises a first channel connecting the first cavity to the second internal volume.

Optionally, the cooling module further comprises a printed circuit board mounted in the first internal volume.

Optionally, the cooling module comprises a liquid coolant and ullage air, wherein the second internal volume accommodates the ullage air.

Optionally, the first and/or second internal major surface further comprises a second cavity and a second channel connecting the second cavity to the first cavity.

Optionally, the first and/or second internal major surface further comprises one or more additional cavities and one or more additional channels connecting each of the one or more additional cavities to at least one other cavity or to the second internal volume.

Optionally, the chamber extends from the casing.

Optionally, the chamber extends from a region in a corner of the casing.

Optionally, the casing comprises a first external major surface, and the chamber extends from a corner of the first external major surface.

Optionally, the chamber extends generally perpendicularly from the first external major surface.

Optionally, the chamber comprises a substantially triangular cross-section.

Optionally, the chamber comprises an orifice.

Optionally, the cooling module further comprises one or more projections extending from an external surface of the casing.

Optionally, the one or more projections extends from the first external major surface.

Optionally, the printed circuit board is a computer motherboard.

BRIEF DESCRIPTION OF THE DRAWINGS

The invention may be put into practice in a number of ways and preferred embodiments will now be described by way of example only and with reference to the accompanying drawings, in which.

DETAILED DESCRIPTION OF PREFERRED EMBODIMENTS

Figure 1:
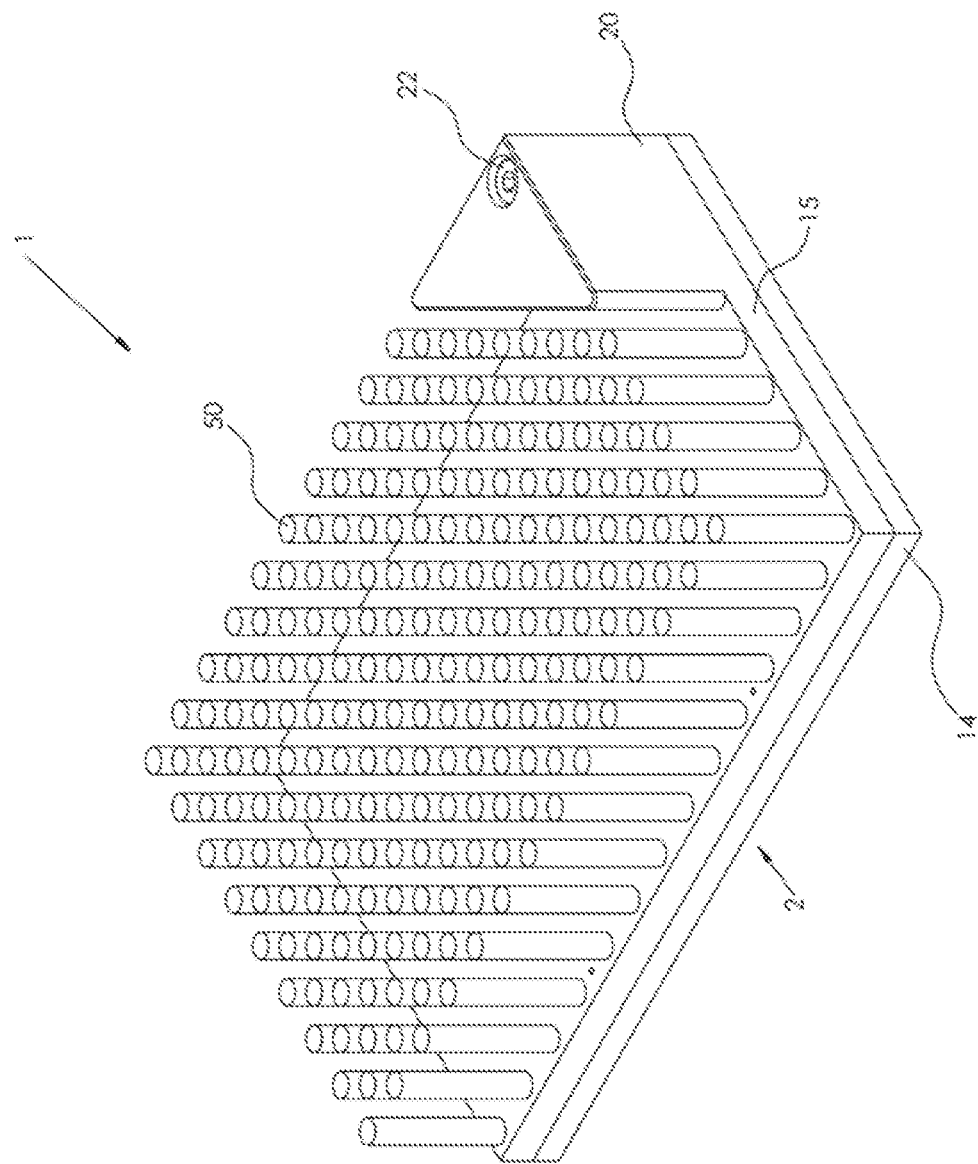
FIG. 1 shows an external perspective view of an embodiment of a cooling module in accordance with the disclosure.

With references to FIGS. 1 to 6, there is shown an embodiment of a cooling module 1 in accordance with the disclosure. The same reference numerals identify the same components in all drawings.

The cooling module 1 may be intended for use in multiple orientations. In particular, the cooling module may be intended for use in a first orientation shown in FIG. 2, which is a generally vertical 'portrait' orientation. The cooling module 1 may be intended for use in a second orientation shown in FIG. 3, which is a generally vertical 'landscape' orientation. The cooling module 1 may further be intended for use in a third orientation shown in FIG. 4, which is a generally horizontal orientation.

The cooling module 1 comprises a casing 2 for housing a printed circuit board 3 having one or more associated electrical/electronic components 4, for example integrated circuits, capacitors, resistors or similar. (The terms electrical and electronic are used analogously herein.) The printed circuit board 3 may, for example, be a computer motherboard. In operation, the electronic components 4 typically generate and dissipate heat. To enable passive cooling, the electronic components 4 are immersed in a dielectric liquid coolant (not shown). The liquid coolant is not electrically conductive, but is normally thermally conductive and can carry heat by conduction and/or convection. Heat is therefore transferred from the electronic components 4 to the dielectric liquid coolant. Dielectric liquid coolant is typically costly, so it is therefore advantageous to minimise a volume within the casing 2 in which the printed circuit board 3, electronic components 4, and dielectric liquid cooling will be housed.

Figure 6:
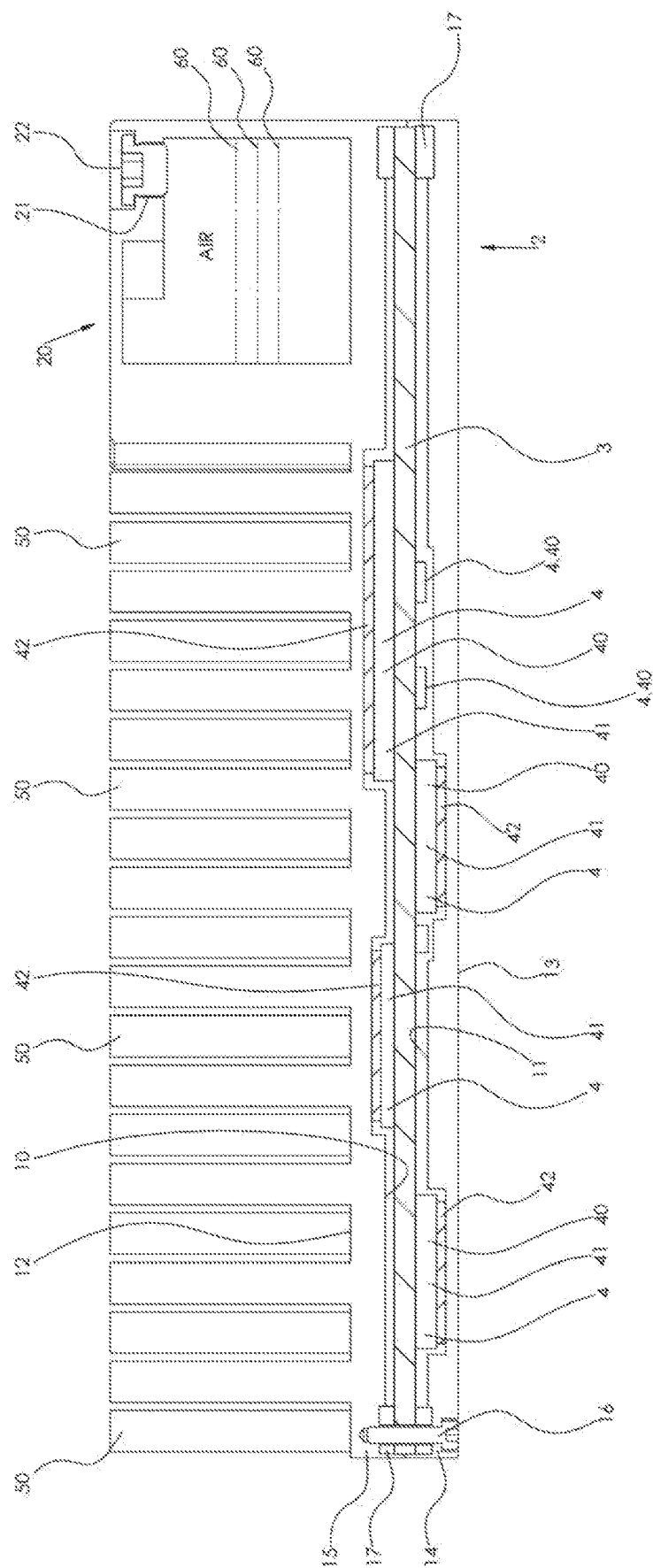
FIG. 6 shows a cross-section of the embodiment of FIG. 1, in the third orientation.

The casing 2 may be generally elongate cuboid shaped, having two opposing major walls connected together by four minor walls, wherein each of the minor walls has a smaller surface area than each of the major walls. Each of the walls may have an internal surface and an opposing external surface (for example, each major wall may have an internal major surface and an opposing external major surface). As shown in FIG. 6, the casing 2 comprises a first internal major surface 10 and a second internal major surface 11 (which generally opposes the first internal major surface 10). The casing 2 further comprises a first external major surface 12 corresponding to the first internal major surface 10, and a second external major surface 13 corresponding to the second internal major surface 11. The casing 2 defines a first internal volume, which is adapted for mounting the printed circuit board 3 therein. For example, the first internal volume may be appropriately shaped and sized for the printed circuit board 3, and it may comprise mounting points for the printed circuit board 3. Other adaptations of the first internal volume for the printed circuit board 3 are discussed below.

The casing 2 may comprise a base 14 (having the second internal major surface 11 and the second external major surface 13) and a lid 15 (having the first internal major surface 10 and the first external major surface 12). The casing 2 may be made from a conductive material. For example, the casing 2 may be made of a metal, such as aluminium. The base 14 and the lid 15 may be joined together to provide, as far as possible, a fluid-tight seal (both liquid-light and gas-tight). For example, the base 14 and the lid 15 may be joined together by fixings 16, which may comprise bolts, with sealing gaskets 17 being provided to achieve a fluid-tight seal. The sealing gaskets 17 may form a seal by being compressed between the base 14 and the lid 15. The sealing gaskets 17 may be made of any suitable material, for example EPDM (ethylene propylene diene monomer) rubber, silicone, rubber, or Viton™. In an alternative embodiment, an O-ring, moulded, or foam seal could be used in place of the sealing gasket 17.

The cooling module 1 may contain ullage air in addition to the liquid coolant. It is desirable to distance the ullage air from the electronic components 4, to ensure that the electronic components 4 are immersed in the liquid coolant for optimal cooling. A chamber 20 defines a second internal volume for accommodating the ullage air. The second internal volume is distinct from, but in fluid communication with, the first internal volume. The second internal volume is advantageously not adapted for mounting a printed circuit board 3 therein.

The chamber 20 may additionally accommodate an increased volume of both coolant and ullage air as the liquid coolant (and, consequently, the ullage air) expands through heating by the electronic components 4. The second internal volume may be optimised for this purpose.

The chamber 20 may be advantageously located such that it is optimally positioned for accommodating the ullage air when the cooling module 1 is positioned in multiple orientations. To achieve this, the chamber 20 may be located in a vertically upper location in the intended orientations. In particular, the chamber 20 may be located such that it is optimally positioned for accommodating the ullage air when the cooling module 1 is in the first, second, and third orientations shown respectively in FIGS. 2 to 4.

The chamber 20 may be internal or external to the casing 2. In the embodiment of FIGS. 1-6, the chamber 20 extends outwardly from the casing 2.

Figure 2:
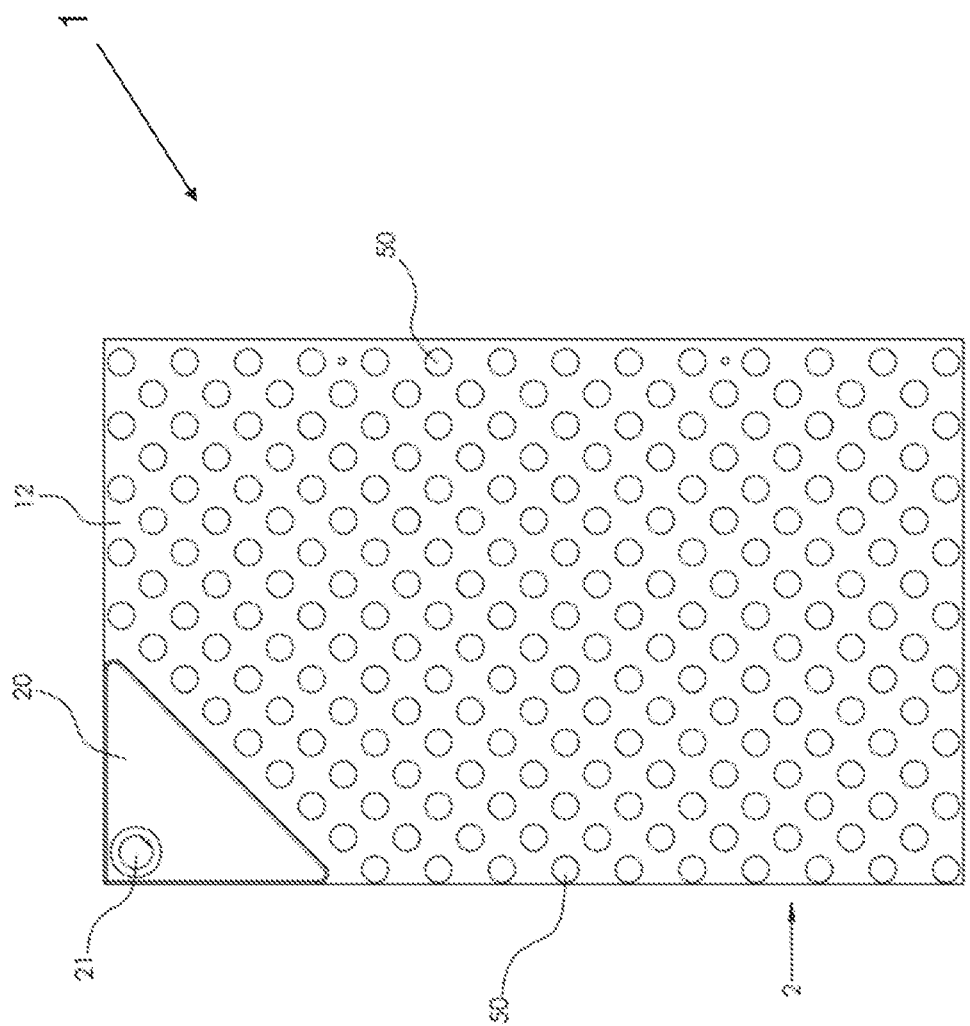
FIG. 2 shows a plan view of the embodiment of FIG. 1 in a first orientation.
Figure 3:
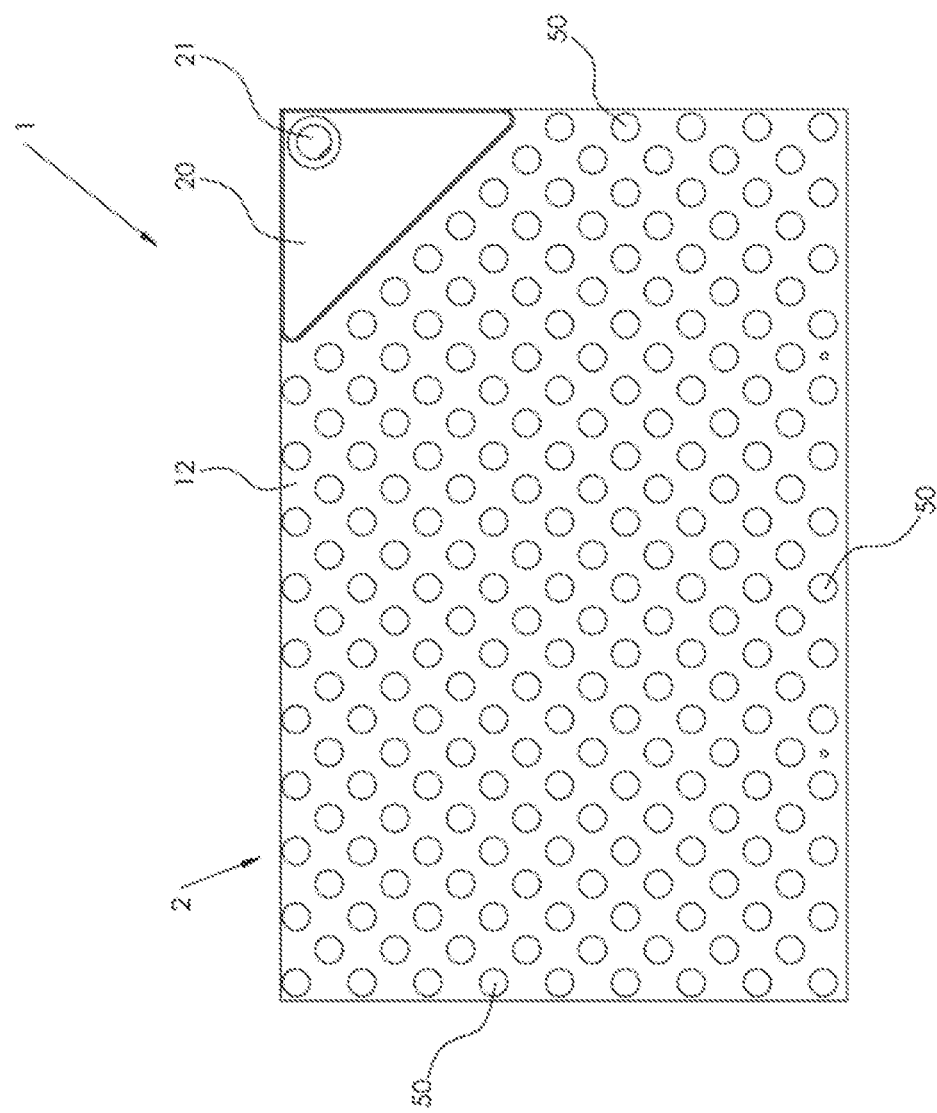
FIG. 3 shows a plan view of the embodiment of FIG. 1 in a second orientation.
Figure 4:
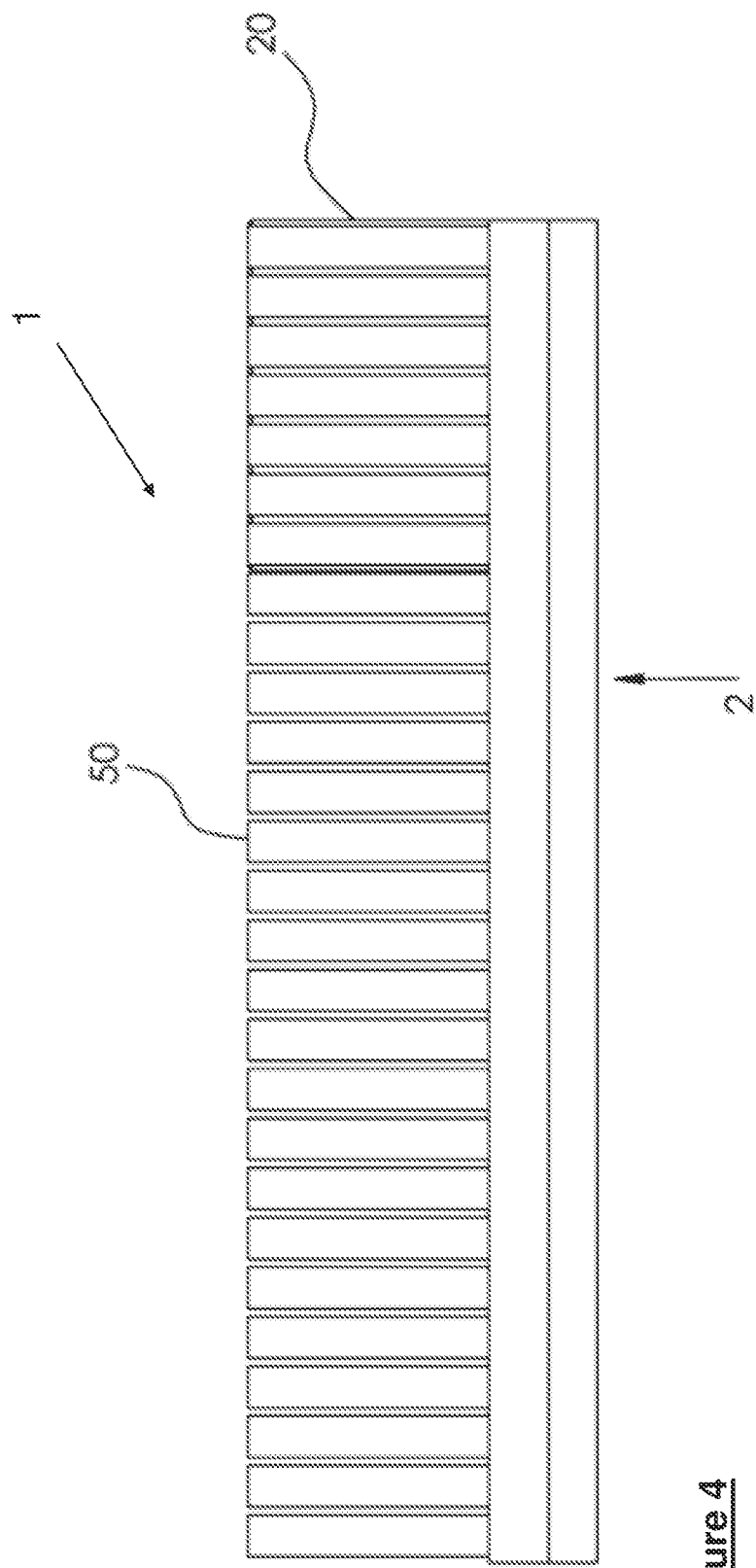
FIG. 4 shows a side view of the embodiment of FIG. 1 in a third orientation.
Figure 5:
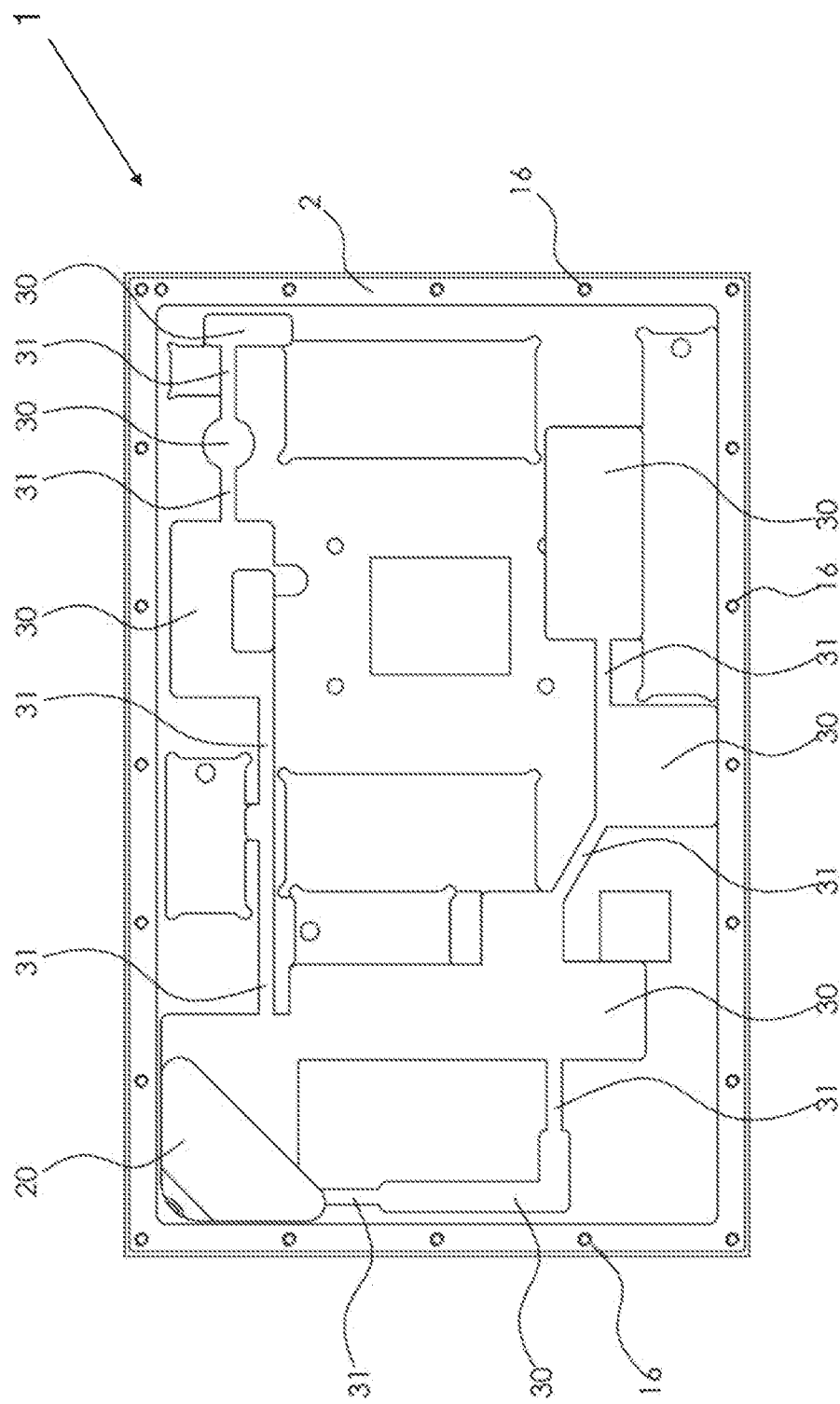
FIG. 5 shows a cross-section of the embodiment of FIG. 1 in the second orientation.

The chamber 20 may be located in the region of a corner of the casing 2, to achieve an advantageous vertically upper location for the chamber 20 when the cooling module 1 is in the first and second orientations (shown respectively in FIGS. 2 and 3). The chamber 20 may extend from an external major surface of the casing 2, to achieve an advantageous vertically upper location for the chamber 20 when the cooling module 1 is in the third orientation (shown in FIG. 4).

In the embodiment of FIGS. 1 to 6, the chamber 20 extends from a corner of the first external major surface 12. The chamber 20 extends generally perpendicularly from the first external major surface 12. The shape of the chamber 20 may be such as to optimise a flow of air around it in one or more of the orientations. For example, as depicted in the embodiment of FIGS. 1 to 6, the chamber 20 may have a generally triangular cross-section in the plane of the first external major surface 12. One or more corners of the triangular cross-section may be chamfered or filleted. The chamber 20 may comprise an orifice 21, for filling the casing 2 with the coolant and for draining the coolant from the casing 2. A sealing plug 22 may be provided to seal the orifice 21. The sealing plug 22 may be a BSPP (British Standard Pipe Parallel) plug, having an embedded O-ring seal.

To minimise the volume within the casing 2, a distance between the first and second internal major surfaces 10,11 may be minimised. To accommodate taller electronic components 40 (i.e. electronic components 4 having a height greater than can be accommodated by the distance between the printed circuit board 3 and the respective internal major surface), the first and second internal major surfaces 10,11 may be provided with one or more cavities 30. The one or more cavities 30 may be in fluid communication with the chamber 20. The first and second internal major surfaces 10,11 may further be provided with channels 31 to fluidly connect successive cavities 30 to each other, eventually leading to the chamber 20.

Additional conductive cooling may be provided to relatively high power electronic components 41 associated with the printed circuit board 3, which may generate and dissipate more heat during operation than other electronic components 4 associated with the printed circuit board 3. Such additional conductive cooling may be provided by coupling these high power electronic components 41 to the casing 2. A thermal interface material 42 may be provided between the high power electronic components 41 and the casing 2, to enhance thermal coupling therebetween. As a non-limiting example, the thermal interface material 42 may comprise one or more of: silicone; viscous grease; a gel; a tape; a film; a coil or spring; a foam; a metal; graphite; or any other suitable material.

The dielectric liquid coolant is cooled by transfer of heat to the casing 2. The casing 2 is air-cooled. Advantageously, projections 50 may extend from an external major surface of the casing 2 and are in direct thermal communication therewith (for example, being formed integrally with casing 2, or being affixed to casing 2 so as to receive heat from casing 2). Projections, such as the projections 50 shown, may significantly increase the transfer of heat from the casing 2 to ambient air, due to the increased surface area for heat transfer. For compactness, the projections 50 may extend from the first external major surface 12, such that they extend from the same side of the casing 2 as the chamber 20. In particular, the projections 50 may extend from the first external major surface 12 to substantially the same distance as the chamber 20 (measured in a direction perpendicular to the plane of the first external major surface 12). The projections 50 may comprise pins and/or fins. The projections 50 preferably extend in a direction perpendicular to the plane of the first external major surface 12 (the projections 50 are beneficially straight). The projections 50 may optimise air flow over the first external major surface 12.

In use, the printed circuit board 3 comprising electronic components 4 is mounted within the base 14 and the lid 15, such that any taller electronic components 40 are located in their corresponding cavities 30 and any high power electronic components 41 are directly coupled to the first internal major surface 10 or the second internal major surface 11. The base 14 and the lid 15 are sealingly-joined via the fixings 16 and the sealing gaskets 17.

With the cooling module 1 in the third orientation, such that the chamber 20 extends generally vertically upwards from the casing 2, the cooling module 1 is filled with liquid coolant via the orifice 21. The volume of liquid coolant must be such that all the electronic components 4 are immersed in the coolant at a range of operational temperatures (for example, at typical room temperatures when the printed circuit board 3 is initially activated, and at elevated temperatures when the coolant temperature is raised through heat generated and dissipated by the electronic components 4). For example, the volume of liquid coolant may be selected such that all the electronic components 4 are immersed in the coolant at operational temperatures between −10° C. and 90° C. Guide tidelines 60 may be marked on or in the chamber 20 to indicate the required volume at various fill temperatures. For example, if the cooling module 1 is hot-filled (i.e. filled with a heated coolant), the fill volume will be greater than if the cooling module 1 is filled with room temperature or chilled coolant. Finally, the cooling module 1 is sealed using the sealing plug 22.

The cooling module 1 may be positioned in one of the first, second, or third orientations. When positioning the cooling module 1 in a chosen orientation, or when moving the cooling module 1 between different orientations, pockets of ullage air may become trapped in one of more of the cavities 30, which may prevent the coolant from fully covering, and thus effectively cooling, the corresponding electronic components 4. By gently agitating and/or rolling the cooling module 1, such air pockets may be directed through the channels 31 back to the chamber 20, so that the cavities 30 will be properly filled with coolant.

Although a specific embodiment has been described, the skilled person will consider various adjustments and/or modifications. For example, the shape of the chamber 20 may be varied significantly. The position of the chamber 20 with respect to the casing 2 may be varied, as determined by the intended orientations for the cooling module 1. Projections 50 on the casing 2 may be provided in a variety of ways, for example involving different shapes, numbers, arrangements and/or heights of projection. In certain embodiments, no projections may be provided. Combinations of specific features disclosed herein that are not mutually exclusive may also be provided, even if such a combination is not explicitly described.

The invention claimed is:

1. A cooling module for a printed circuit board having one or more heat generating components, the cooling module comprising:
   a casing defining a first internal volume adapted for mounting the printed circuit board therein, the casing comprising:
      a lid having a first internal major surface, and
      a base having a second internal major surface opposing the first internal major surface,
         wherein the first internal volume is defined between the first internal major surface and the second internal major surface; and
   a chamber defining a second internal volume in fluid communication with the first internal volume;
   wherein
   at least one of the first internal major surface and the second internal major surface comprises a first cavity; and
   at least one of the first internal major surface and the second internal major surface further comprises a first channel connecting the first cavity to the second internal volume;
   wherein the chamber extends from a region in a corner of the casing.

2. The cooling module according to claim 1, further comprising a printed circuit board mounted in the first internal volume.

3. The cooling module according to claim 1, wherein the cooling module comprises a liquid coolant and ullage air, and wherein the second internal volume accommodates the ullage air.

4. The cooling module according to claim 1, wherein at least one of the first internal major surface and the second internal major surface further comprises a second cavity and a second channel connecting the second cavity to the first cavity.

5. The cooling module according to claim 4, wherein the at least one of the first internal major surface and the second internal major surface further comprises one or more additional cavities and one or more additional channels connecting each of the one or more additional cavities to at least one other cavity or to the second internal volume.

6. The cooling module according to claim 1, wherein the chamber comprises a substantially triangular cross-section.

7. The cooling module according to claim 1, wherein the chamber comprises an orifice.

8. The cooling module according to claim 1, further comprising one or more projections extending from an external surface of the casing.

9. The cooling module according to claim 8, wherein:
   the casing comprises a first external major surface;
   the chamber extends from a corner of the first external major surface; and
   the one or more projections extends from the first external major surface.

10. The cooling module according to claim 1, wherein the printed circuit board is a computer motherboard.

\* \* \* \* \*